June 24, 1969     V. A. RIDDELL     3,451,384
FORMED WHEEL DRESSER
Filed Nov. 10, 1966
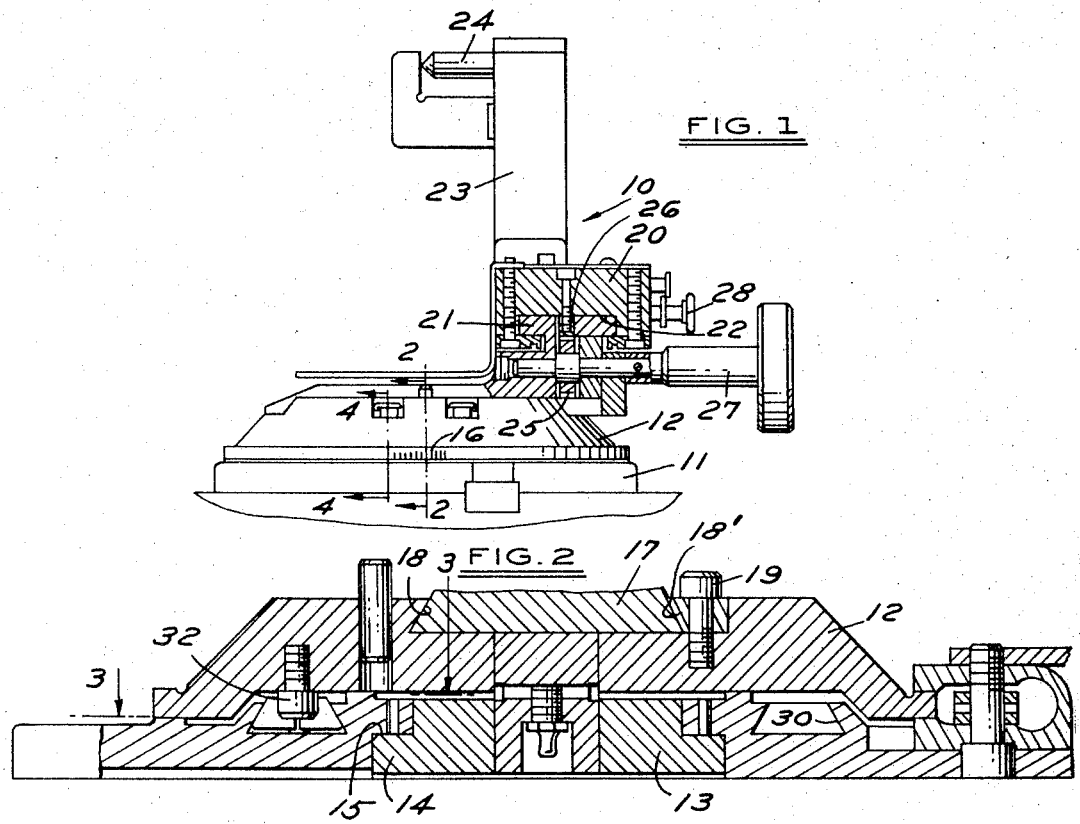
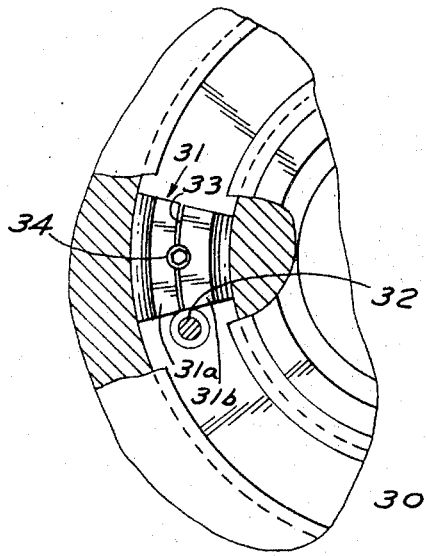
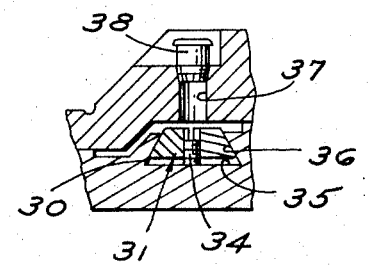
INVENTOR
VERNON A RIDDELL
BY
Barnes, Kisselle, Raisch & Choate
ATTORNEYS

United States Patent Office 3,451,384
Patented June 24, 1969

3,451,384
FORMED WHEEL DRESSER
Vernon A. Riddell, Farmington, Mich., assignor to Vinco Corporation, Detroit, Mich., a corporation of Michigan
Filed Nov. 10, 1966, Ser. No. 593,574
Int. Cl. B28d 1/16; B23b 3/28
U.S. Cl. 125—11     16 Claims

ABSTRACT OF THE DISCLOSURE

A formed wheel dresser comprising a base and an index plate rotatably mounted on the base. A first slide is slidably mounted on the index plate and a second slide is mounted for movement transversely on the first slide and is adapted to carry a dressing tool. The index plate has at least one vertically extending opening therethrough and stop engaging means on the index plate are adapted to engage stop means on the base, the latter being accessible through the opening for adjustably limiting the rotational movement of the index plate relative to the base.

---

This invention relates to formed wheel dressers.

In the patent to Osplack 1,961,242, issued June 5, 1934, there is shown a formed wheel dresser wherein an abrasive wheel may be dressed to a desired form or contour.

Among the objects of this invention are to provide an improved formed wheel dresser of the type shown in the Osplack patent which is relatively simple in construction, which can be easily adjusted and which can produce an accurate circumferential movement of the dressing tool.

In the drawings:

FIG. 1 is a part sectional side elevational view of the formed wheel dresser embodying the invention.

FIG. 2 is a fragmentary sectional view on an enlarged scale taken along the line 2—2 in FIG. 1.

FIG. 3 is a fragmentary sectional view taken along the line 3—3 in FIG. 2.

FIG. 4 is a fragmentary sectional view on an enlarged scale taken along the line 4—4 in FIG. 1.

Referring to FIGS. 1 and 2, the formed wheel dresser embodying the invention is adapted to be mounted on a machine adjacent the abrasive wheel that is to be dressed. As shown in FIGS. 1 and 2, the formed wheel dresser 10 comprises a base 11 on which an index plate 12 is rotatably mounted about a vertical axis by a retainer plate 13 that is fixed to the index plate 12 and has a laterally extending flange 14 that extends beneath a shoulder 15 on the base 11. As shown in FIG. 1, the index plate 12 and base 11 have cooperating indicia 16 for accurately indicating the relative position of the index plate 12 relative to the base 11.

A first slide 17 is movable in a diametral track 18 in the upper surface of the index plate 12 and is held in predetermined relation thereto by a way block 18' that is clamped on one edge of the silde 17 by screws 19. A second slide 20 is mounted for movement transversely of the direction of the movement of the first slide 17 and on the first slide 17. Specifically, the first slide 17 includes longitudinally extending flanges 21 while the second slide 20 includes complementary recess 22. The second slide 20 supports a tool support 23 which, in turn, supports a dressing tool 24.

The second slide 20 is translated relative to the first slide 17 by a gear 25 that meshes with a rack 26 and is operated by rotation of a knob 27. Stops 28 are adapted to be moved inwardly and control the extent of movement of the second slide 20 relative to the first slide 17.

The above-described arrangement is conventional as shown, for example, in the aforementioned patent to Osplack 1,961,242.

In accordance with the invention, in order to accurately adjust and limit the rotational movement of the index plate 12 relative to the base 11, an endless upwardly facing track 30 is provided in the upper surface of the base 11 beneath the index plate 12. The track 30 has a dovetail cross section and two spilt stops 31 are provided in the track 30 and are adapted to be engaged by the head of a cap screw 32 that projects downwardly from the index plate 12 into the track 30.

As shown in FIGS. 3 and 4, each stop 31 is split along a circumferential line 33 to form two segments 31a, 31b and an Allen head screw 34 is threaded downwardly into a threaded opening formed in the stop 31 before it is split until it engages the base 35 of the track 30 to force the segments 31a, 31b upwardly against the inclined surfaces 36 of the track 30. This locks the stop 31 in any circumferential position in the track 30.

In order to facilitate adjustment of the stop 31, the index plate 12 is formed with vertical openings 37 extending downwardly and exposing the track 30. By rotating the index plate 12 to align an opening 37 with the screw 34, access to the screw is achieved so that an Allen head wrench can be inserted to loosen the screw 34. The index plate 12 can then be rotated with the wrench in engagement with the screw, carrying the stop 31 to a new position. Thereupon rotation of the Allen head wrench will thread screw 34 downwardly and lock the stop 31 in the new position. In order to prevent dirt from entering the opening 37, a spring loaded cap fitment 38 such as is used to cover oil openings in machinery is provided on the upper end of each opening 37.

It can thus be seen that there has been provided a formed wheel dresser wherein the circumferential movement of the index plate is positively controlled and can be readily adjusted without removing the wheel dresser from the machine; which is relatively simple and free of maintenance.

I claim:

1. In a dresser or the like, the combination comprising a base,
   an index plate rotatably mounted on said base,
   a first slide slidably mounted on said index plate,
   a second slide mounted for movement on said first slide in a direction generally transverse to the direction of movement of said first slide relative to said index plate,
   said second slide adapted to carry a dressing tool,
   said index plate having at least one substantially vertically extending opening therethrough,
   stop engaging means on said index plate,
   stop means on said base engageable with said stop engaging means and accessible through said opening for adjustably limiting the rotational movement of said index plate relative to said base.

2. The combination set forth in claim 1 wherein said stop means includes a track on said base and at least one stop mounted in said track,
   said index plate having a projection thereon adapted to engage said stop.

3. The combination set forth in claim 2 wherein said track has a dovetail cross section.

4. The combination set forth in claim 2 wherein said adjustable stop comprises a transversely split member and a screw threaded into said member and adapted to move said stop axially against the sides of said track to hold said stop in circumferential position in said track.

5. The combination set forth in claim 2 wherein said track has a dovetail cross section,
   said stop having a complementary dovetail cross section and being split along a circumferentially extending line, a screw threaded into said stop axially and adapted to engage the base of said track for moving the segments axially against the walls of said track.

6. The combination set forth in claim 5 wherein said screw includes an Allen head that is exposed to said opening in said index plate.

7. The combination set forth in claim 5 wherein said track is endless.

8. In a dresser or the like, the combination comprising
a base,
an index plate rotatably mounted on said base,
a first slide slidably mounted on said index plate,
a second slide mounted for movement on said first slide in a direction generally transverse to the direction of movement of said first slide relative to said index plate,
said second slide adapted to carry a dressing tool,
said index plate having at least one substantially vertically extending opening,
stop engaging means on said index plate,
stop means on said base engageable with said stop engaging means and accessible through said opening for adjustably limiting the rotational movement of said index plate relative to said base comprising an endless track on said base and at least one stop mounted in said track,
said index plate having a projection thereon adapted to engage said stop.

9. The combination set forth in claim 8 wherein said endless track has a dovetail cross section.

10. The combination set forth in claim 8 wherein said adjustable stop comprises a transversely split member and a screw threaded into said member and adapted to move said stop axially against the sides of said track to hold said stop in circumferential position in said track.

11. The combination set forth in claim 8 wherein said track has a dovetail cross section,
said stop having a complementary dovetail cross section and being split along circumferentially extending lines,
a screw threaded into said stop axially and adapted to engage the base of said track for moving the segments axially against the walls of said track.

12. In a dresser or the like, the combination comprising
a base,
an index plate rotatably mounted on said base,
said index plate having at least one substantially vertically extending opening therethrough,
stop engaging means on said index plate,
stop means on said base engageable with said stop engaging means and accessible through said opening for adjustably limiting the rotational movement of said index plate relative to said base.

13. The combination set forth in claim 12 wherein said stop means includes a track on said base and at least one stop mounted in said track,
said index plate having a projection thereon adapted to engage said stop.

14. The combination set forth in claim 13 wherein said adjustable stop comprises a transversely split member and a screw threaded into said member and adapted to move said stop axially against the sides of said track to hold said stop in circumferential position in said track.

15. The combination set forth in claim 13 wherein said track has a dovetail cross section,
said stop having a complementary dovetail cross section and being split along circumferentially extending lines,
a screw threaded into said stop axially and adapted to engage the base of said track for moving the segments axially against the walls of said track.

16. The combination set forth in claim 15 wherein said screw includes an Allen head that is exposed to said opening in said index plate.

References Cited

UNITED STATES PATENTS 1,961,242   6/1934   Osplack.
2,336,758  12/1943   Statia.

OTHELL M. SIMPSON, *Primary Examiner.*

U.S. Cl. X.R.

82—12